(12) United States Patent
Hong et al.

(10) Patent No.: US 11,952,998 B2
(45) Date of Patent: Apr. 9, 2024

(54) CRANKSHAFT, INVERTER COMPRESSOR, AND REFRIGERATION DEVICE

(71) Applicant: ANHUI MEIZHI COMPRESSOR CO., LTD., Anhui (CN)

(72) Inventors: Jiahua Hong, Anhui (CN); Xuebao Shen, Anhui (CN); Hongjun Cao, Anhui (CN)

(73) Assignee: ANHUI MEIZHI COMPRESSOR CO., LTD., Anhui (CN)

( * ) Notice: Subject to any disclaimer, the term of this patent is extended or adjusted under 35 U.S.C. 154(b) by 0 days.

(21) Appl. No.: 18/106,582

(22) Filed: Feb. 7, 2023

(65) Prior Publication Data

US 2023/0184242 A1 Jun. 15, 2023

Related U.S. Application Data (63) Continuation of application No. PCT/CN2022/085618, filed on Apr. 7, 2022.

(30) Foreign Application Priority Data

Apr. 14, 2021 (CN) .......................... 202110410679.1
Apr. 14, 2021 (CN) .......................... 202120767794.X (51) Int. Cl.
*F04B 53/18* (2006.01)
*F04B 53/00* (2006.01)
(Continued)

(52) U.S. Cl.
CPC ............ *F04B 53/18* (2013.01); *F04B 53/006* (2013.01); *F16C 3/14* (2013.01); *F25B 31/002* (2013.01)

(58) Field of Classification Search
CPC . F04B 39/0253; F04B 39/0246; F04B 53/006
See application file for complete search history.

(56) References Cited

U.S. PATENT DOCUMENTS 3,276,677 A * 10/1966 Trask .................. F16C 33/1065
                 415/72
3,491,939 A * 1/1970 Holme ................ F04B 39/0094
                 417/372
(Continued)

FOREIGN PATENT DOCUMENTS

| CN | 1497177 A | 5/2004 |
|---|---|---|
| CN | 105041610 A | 11/2015 |

(Continued)

OTHER PUBLICATIONS

International Search report dated Jul. 12, 2022 received in International Application No. PCT/CN2022/085618.
(Continued)

*Primary Examiner* — Michael A Riegelman
(74) *Attorney, Agent, or Firm* — Scully, Scott, Murphy & Presser, P.C.

(57) ABSTRACT

A crankshaft, an inverter compressor and a refrigeration device are provided. The crankshaft has a main shaft, a crank, and a crank shaft at an end of the main shaft through the crank. The main shaft has an oil suction inner chamber, and an oil distribution channel penetrating the crank shaft. An outer wall surface of the main shaft has a first spiral oil groove and a second spiral oil groove. One end of each of the first spiral oil groove and a second spiral oil groove is in communication with the oil suction inner chamber. Another end of the first spiral oil groove and another end of the second spiral oil groove are formed as a first hole channel and a second hole channel in communication with the oil distribution channel, respectively.

20 Claims, 8 Drawing Sheets

(51) Int. Cl.
*F16C 3/14* (2006.01)
*F25B 31/00* (2006.01)

(56) References Cited

U.S. PATENT DOCUMENTS

| | | | | |
|---|---|---|---|---|
| 3,848,702 | A * | 11/1974 | Bergman | F16N 7/366 |
| | | | | 418/94 |
| 4,568,253 | A * | 2/1986 | Wood | F04C 29/028 |
| | | | | 417/372 |
| 5,795,140 | A * | 8/1998 | Jin | F04B 39/0246 |
| | | | | 417/372 |
| 5,842,420 | A | 12/1998 | Khoo et al. | |
| 6,457,561 | B1 * | 10/2002 | Goodnight | F16N 7/366 |
| | | | | 184/6.16 |
| 7,100,743 | B2 * | 9/2006 | Park | F04B 39/0246 |
| | | | | 184/6.16 |
| 7,631,729 | B2 * | 12/2009 | Tsuchiya | F04B 39/0253 |
| | | | | 417/415 |
| 7,993,114 | B2 * | 8/2011 | Hayashi | F04B 39/0253 |
| | | | | 184/6.5 |
| 8,202,067 | B2 * | 6/2012 | Klein | F04B 39/0246 |
| | | | | 417/372 |
| 8,978,826 | B2 * | 3/2015 | Kim | F04B 39/0253 |
| | | | | 417/372 |
| 9,188,215 | B2 * | 11/2015 | Tage | F16H 57/0428 |
| 10,697,586 | B2 * | 6/2020 | Poster | F02C 7/36 |
| 10,844,759 | B2 * | 11/2020 | Sacomori | F04B 39/0246 |
| 11,371,496 | B2 * | 6/2022 | Shen | F02B 75/045 |
| 11,493,039 | B2 * | 11/2022 | Huang | F04B 39/0094 |
| 2004/0126250 | A1 * | 7/2004 | Tsuchiya | F04B 39/0253 |
| | | | | 417/368 |
| 2004/0151604 | A1 * | 8/2004 | Ishida | F04B 39/0253 |
| | | | | 417/372 |
| 2004/0241013 | A1 * | 12/2004 | Park | F04B 49/126 |
| | | | | 417/313 |
| 2006/0275157 | A1 * | 12/2006 | Hayashi | F04B 39/0253 |
| | | | | 417/415 |
| 2011/0265510 | A1 * | 11/2011 | Kim | F04B 27/0404 |
| | | | | 417/437 |
| 2012/0201699 | A1 * | 8/2012 | Kim | F04B 39/0238 |
| | | | | 417/372 |
| 2014/0314589 | A1 * | 10/2014 | Kim | F04B 39/0246 |
| | | | | 417/368 |
| 2015/0147203 | A1 * | 5/2015 | Kim | F04C 29/025 |
| | | | | 417/372 |
| 2017/0306941 | A1 * | 10/2017 | Kawano | F04B 39/0253 |
| 2020/0149521 | A1 * | 5/2020 | Shen | F02B 75/045 |
| 2021/0062798 | A1 * | 3/2021 | Akashi | F04B 39/0094 |
| 2021/0115922 | A1 * | 4/2021 | Huang | F04B 39/0253 |
| 2022/0145872 | A1 * | 5/2022 | Jeong | F04B 39/0246 |
| 2022/0170475 | A1 * | 6/2022 | Park | F04B 39/0253 |
| 2023/0065792 | A1 * | 3/2023 | Miguel | F04B 39/0246 |
| 2023/0184242 | A1 * | 6/2023 | Hong | F04B 53/006 |
| | | | | 184/6.5 |

FOREIGN PATENT DOCUMENTS

| | | | |
|---|---|---|---|
| CN | 214533435 U | | 10/2021 |
| CN | 214577616 U | | 11/2021 |
| CN | 214577618 U | | 11/2021 |
| CN | 214741941 U | | 11/2021 |
| JP | S60116885 A | | 6/1985 |
| JP | 2004138017 A | | 5/2004 |
| JP | 2004144058 A | | 5/2004 |
| JP | 2005513326 A | | 5/2005 |
| JP | 2007510836 A | | 4/2007 |
| JP | 2010038009 A | | 2/2010 |
| KR | 20000038950 A | * | 7/2000 |
| KR | 20000038950 A | | 7/2000 |
| KR | 100854744 B1 | * | 8/2002 |

OTHER PUBLICATIONS

Notice of Reasons for Refusal dated Jan. 30, 2024 received in Japanese Patent Application No. JP 2023-507291.

* cited by examiner

CRANKSHAFT, INVERTER COMPRESSOR, AND REFRIGERATION DEVICE

CROSS-REFERENCE TO RELATED APPLICATIONS

The present application a continuation of International Application No. PCT/CN2022/085618, filed on Apr. 7, 2022, which claims priorities to and benefits of Chinese Patent Application No. 202110410679.1 and No. 202120767794.X, both entitled "CRANKSHAFT, INVERTER COMPRESSOR, AND REFRIGERATION DEVICE" and filed with China National Intellectual Property Administration on Apr. 14, 2021, the entire contents of each of which are incorporated herein by reference for all purposes. No new matter has been introduced.

FIELD

The present disclosure relates to the field of compressor technologies, and more particularly, to a crankshaft, an inverter compressor, and a refrigeration device.

BACKGROUND

A crankshaft is one of the most important components in various compressors. The crankshaft is configured to carry a force transmitted by a link, convert the force into a torque output, and drive other components of the compressor to operate. Generally, the crankshaft includes a main shaft, a crank, and a crank shaft. The main shaft has an oil groove. The oil groove and other cavity and hole structures formed in the main shaft and the crank shaft are formed as an oil supply system of the crankshaft. The oil supply system is configured to guide lubricating oil such as engine oil into or out of the crankshaft. Therefore, a lubricating oil film is formed on surfaces of movable components such as the crankshaft to lubricate each of the movable components. Thus, it is possible to ensure that the movable components such as the crankshaft can operate flexibly. In particular, for an inverter compressor, the inverter compressor requires frequently frequency variation and volume variation. A motor and the crankshaft of the compressor are not only required to rotate forwards, but also required to rotate backwards. As a result, the oil supply system of the crankshaft should ensure oil supply during both the forward and the backward rotations.

In the related art, two spiral oil grooves with opposite spiral directions are typically formed in the main shaft and are both in communication with an oil distribution channel extending from the crank shaft into the main shaft. When the crankshaft rotates forwards, the lubricating oil is delivered to the oil distribution channel through the forward-spiraling oil groove and subsequentially flows out of the crank shaft. When the crankshaft rotates backwards, the lubricating oil is delivered through the backward-spiraling oil groove. Therefore, the lubricating oil can be supplied through both the forward and backward rotations of the crankshaft. However, although such a structure can solve an oil supply problem of the crankshaft in both forward and backward rotations, when it is required to supply a substantially equal amount of the lubricating oil during the forward and backward rotation of the crankshaft, there is no reasonable solutions in the related art. As a result, it is difficult to supply the substantially equal amount of the lubricating oil when the crankshaft rotates forwards and backwards, which results in insufficient supply of the lubricating oil in one direction or excessive supply of the lubricating oil in another direction when the crankshaft rotates forwards or backwards at a same speed.

SUMMARY

One of main objects of the present disclosure is to provide a crankshaft, an inverter compressor, and a refrigeration device to at least solve a technical problem that it is difficult for the crankshaft in the related art to ensure that a substantially equal amount of lubricating oil can be realized when the crankshaft rotates forward and backward at a same speed.

In order to achieve the above objects of the present disclosure, based on the fact that a compressor needs to have a lubricating oil system disposed on the crankshaft, and meanwhile, since the compressor has two rotation and operation working conditions including a forward rotation and a backward rotation, especially for an inverter compressor, the forward and backward rotations are associated with frequency modulation and speed regulation of the compressor. As a result, in order to achieve equal supply of the lubricating oil during the forward and backward rotations of the inverter compressor, lubricating oil supply for the two working conditions including the forward and backward rotations of the compressor is required to be first satisfied. That is, it should be possible to ensure that the lubricating oil can be supplied during both the forward and backward rotations of the compressor. On this basis, the supply amount of the lubricating oil during both forward and backward constant-speed rotations has been studied, various lubricating oil supply systems capable of stably supplying the lubricating oil during the forward and backward rotations has been designed, these system has been tested, and the following technical solutions based on test results have been provided.

According to some embodiments of the present disclosure, a crankshaft is provided. The crankshaft includes a main shaft, a crank, and a crank shaft. The crank shaft is mounted at an end of the main shaft through the crank. One end of the main shaft away from the crank shaft has an oil suction inner chamber, and another end of the main shaft connected to the crank shaft has an oil distribution channel extending to and perpetrating the crank shaft. An outer wall surface of the main shaft has a first spiral oil groove and a second spiral oil groove. A spiraling direction of the first spiral oil groove is opposite to a spiraling direction of the second spiral oil groove. One end of each of the first spiral oil groove and the second spiral oil groove is in communication with the oil suction inner chamber, another end of the first spiral oil groove deflects towards a central axis of the main shaft to form a first hole channel in communication with a first oil hole, and another end of the second spiral oil groove deflects towards the central axis of the main shaft to form a second hole channel in communication with a second oil hole. A depth of the first hole channel is substantially equal to a depth of the second hole channel, and an area of an outlet, in communication with a distribution oil hole, of the first hole channel is substantially equal to an area of an outlet, in communication with the distribution oil hole, of the second hole channel.

In some embodiments, both the first hole channel and the second hole channel extend in a radial direction of the main shaft.

In some embodiments, the first spiral oil groove spirals in an outer peripheral wall of the main shaft at a first spiral angle. The second spiral oil groove spirals in the outer peripheral wall of the main shaft at a second spiral angle greater than the first spiral angle, and both the first spiral angle and the second spiral angle are equal to or smaller than 180°. The oil distribution channel is disposed close to the second hole channel, and is offset from or inclined towards the first hole channel in an extending direction of the central axis of the main shaft.

In some embodiments, the oil distribution channel is disposed at a central position of the main shaft. The first spiral oil groove and the second spiral oil groove spiral in an outer peripheral wall of the main shaft at a substantially same spiral angle.

In some embodiments, the first spiral oil groove and the second spiral oil groove have a same spiral pitch.

In some embodiments, the outlet of the first hole channel and the outlet of the second hole channel are arranged at a same level in the central axis direction of the main shaft.

In some embodiments, the outlet of the first hole channel and the outlet of the second hole channel are arranged at different levels in the central axis direction of the main shaft.

In some embodiments, a top of the outlet of the second hole channel is arranged at an equal or lower level than a bottom of the outlet of the first hole channel.

In some embodiments, the main shaft further has an oil inlet hole. The first spiral oil groove and the second spiral oil groove are in communication with the oil suction inner chamber through the oil inlet hole.

In some embodiments, one oil inlet hole is provided, and the first spiral oil groove and the second spiral oil groove are in communication with the oil suction inner chamber through the one oil inlet hole; or two oil inlet holes are provided, and the first spiral oil groove and the second spiral oil groove are in communication with the oil suction inner chamber through the two oil inlet holes, respectively.

In some embodiments, the oil distribution channel is a straight channel.

In some embodiments, a section of the oil distribution channel located in the main shaft is a straight channel section. A section of the oil distribution channel located in the crank shaft is an arc-shaped channel section b away from the main shaft.

In some embodiments, an included angle θ between a projection line of a central axis of the first hole channel and a projection line of a central axis of the second hole channel on a projection plane satisfies 25°<θ<155°, and the projection plane is a plane extending in a radial direction of the main shaft.

According to some embodiments of the present disclosure, an inverter compressor is provided, and the inverter compressor includes the crankshaft as described above.

According to some embodiments of the present disclosure, a refrigeration device is provided, and the refrigeration device includes the inverter compressor as described above.

The crankshaft according to some embodiments of the present disclosure has the following beneficial effects. By forming the first spiral oil groove and the second spiral oil groove that have opposite spiral directions in the main shaft, it is ensured that the compressor with the crankshaft can supply the lubricating oil through the first spiral oil groove and the second spiral oil groove during forward and backward rotations of the compressor, respectively. The first spiral oil groove is in communication with the oil distribution channel through the first hole channel. The second spiral oil groove is in communication with the oil distribution channel through the second hole channel. Further, it is ensured that depths of the first hole channel and the second hole channel extending in the main shaft are equal to each other. That is, it is possible to ensure that an end of the first spiral oil groove and an end portion of the second spiral oil groove penetrate side walls of the main shaft by a same thickness and subsequentially communicate with the oil distribution channel. The outlet of the first hole channel and the outlet of the second hole channel that have the same opening area are formed on the peripheral wall of the oil distribution channel. In this way, since the depths of the first hole channel and the second hole channel are equal to each other, when the crankshaft rotates forwards and backwards at a same speed, resistances subject to the lubricating oil when entering the oil distribution channel through the two hole channels are same to each other to ensure that the lubricating oil can flow out of the first hole channel and the second hole channel at the same velocity. In this way, it is possible to ensure that when the crankshaft rotates forwards and backwards at the same rotation speed, an amount of the lubricating oil supplied from the first spiral oil groove is equal to an amount of the lubricating oil supplied through the second spiral oil groove. Thus, an equal supply amount of the crankshaft can be realized during forward and backward constant-speed rotations, and a problem of insufficient supply of the lubricating oil in one direction or excessive supply of the lubricating oil in another direction can be avoided during the constant-speed rotations.

The inverter compressor according to some embodiments of the present disclosure has the following beneficial effects. With the crankshaft, when the inverter compressor rotates forwards and backwards at the constant-speed, an equal supply amount of lubricating oil can be achieved to ensure that the compressor can effectively operate at the constant speed in forward and backward rotation directions, which reduces wear of a friction pair or waste of the lubricating oil. Thus, it is possible to ensure that the compressor can provide stable lubricating oil supply under different frequency-variable operating conditions, and thus operation of the compressor is more stable and efficient.

The refrigeration device according to some embodiments of the present disclosure has the following beneficial effects. Since the inverter compressor is employed, the refrigeration device can operate more stably and have more stable refrigeration effect, lower operation consumption, and longer service life.

BRIEF DESCRIPTION OF THE DRAWINGS

In order to clearly explain technical solutions of embodiments of the present disclosure, accompanying drawings used in description of embodiments are briefly described below. The accompanying drawings as described below are merely some embodiments of the present disclosure. Based on these accompanying drawings, other accompanying drawings can be obtained by those of ordinary skill in the art without creative effort.

In the drawings, the drawings are mainly marked as:
10, main shaft; 11, oil suction inner chamber; 12, oil distribution channel; 121, straight channel section; 122, arc-shaped channel section; 13, first spiral oil groove; 14, second spiral oil groove; 15, first oil hole; 151, first hole channel; 16, second oil hole; 161, second hole channel; 17, oil inlet hole; 20, crank; 30, crankshaft; 31, oil outlet hole.

DETAILED DESCRIPTION

In order to make objects, technical solutions, and advantages of the present disclosure more obvious and understandable, the present disclosure will be further described in detail below in conjunction with the accompanying drawings and embodiments. It should be understood that exemplary embodiments described herein are only used to explain, rather than limiting, the present disclosure.

It should be noted that when a component is referred to as being "fixed to", "disposed on", "provided on", or "arranged on" another component, it may be directly or indirectly on the other component. When one component is referred to as being "connected to" or "coupled to" another component, it may be directly or indirectly connected to the other component. Terms such as "over", "below", "left", "right", etc., is based on the orientation or position relationship shown in the accompanying drawings, and is only for the convenience of describing the present disclosure and simplifying the description, rather than indicating or implying that the associated device or element must have a specific orientation, or be constructed and operated in a specific orientation, and therefore cannot be understood as a limitation on the present disclosure. For those of ordinary skill in the art, the specific meanings of the above terms may be understood based on specific situations. The terms "first" and "second" are only used for descriptive purposes, and cannot be understood as indicating or implying relative importance or implicitly indicating the number of indicated technical features. "A plurality of" means at least two, unless otherwise specifically defined.

Generally, a common compressor typically includes a housing, a crankcase, a crankshaft, an oil pump, a link, a piston, a piston pin, a valve bank, a driving motor, and the like. A bottom of the housing has an oil pool for storing lubricating oil (also referred to as frozen oil). The crankshaft includes a main shaft in a driving connection with the driving motor, and a crank connected to an end of the main shaft. A lubricating oil supply system (an oil supply system) is generally disposed inside the crankshaft. The oil pump is mounted at a bottom of the crankshaft, and has an oil pumping outlet in communication with the oil supply system inside the crankshaft. When the compressor is in operation, the crankshaft rotates. At this time, with a cooperation of a centrifugal force generated by a rotation of the crankshaft and a pumping pressure of the oil pump, the lubricating oil at a bottom of the housing is delivered through the oil supply system and guided to each friction pair of the compressor for lubrication. Thus, friction loss between all components in the compressor during operation can be reduced. Meanwhile, the lubricating oil further provides a certain cooling and temperature reduction effect. Therefore, lubricating oil supply amount of the crankshaft has an important influence on normal operation of the compressor.

Since an inverter compressor has two rotation operating conditions including forward rotation and backward rotation, the oil supply system disposed in the crankshaft needs to satisfy lubricating oil supply under the two operating conditions, in which the inverter compressor rotates forwards in a clockwise direction and backwards in an anti-clockwise direction. That is, it is ensured that the lubricating oil can be supplied under both the forward and backward rotation operating conditions of the inverter compressor to be supplied to the friction pair. On this basis, embodiments of the present disclosure further optimize the design of the crankshaft of the inverter compressor to improve the supply amount of the lubricating oil when the crankshaft rotates forwards and backwards at a constant speed. Thus, there is provided a lubricating oil supply system capable of stably supplying the lubricating oil with an equal amount under operating conditions of forward and backward rotations at constant-speed. The crankshaft according to some embodiments of the present disclosure will be described below in detail with reference to some examples.

Figure 1:
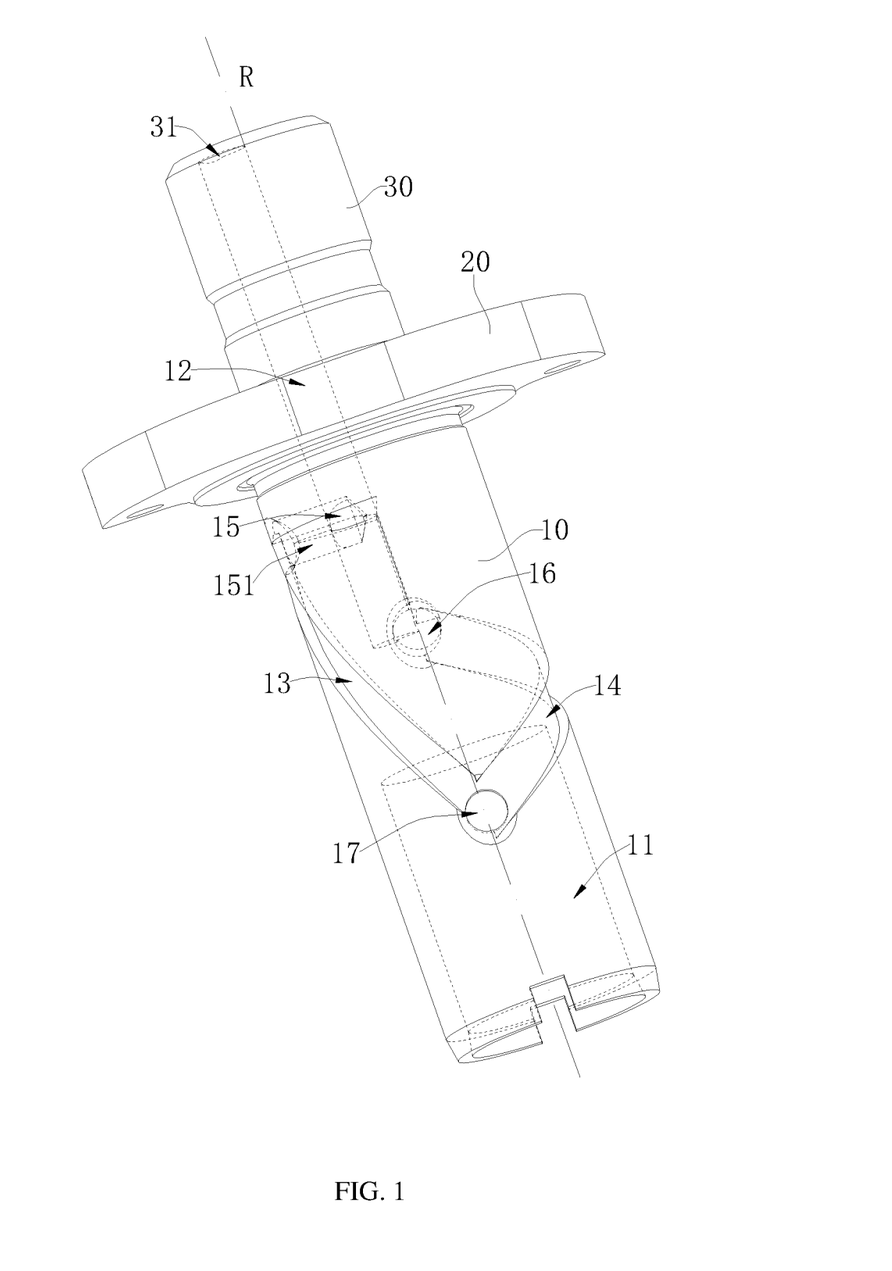
FIG. 1 is a schematic structural view of a crankshaft according to an embodiment of the present disclosure.
Figure 2:
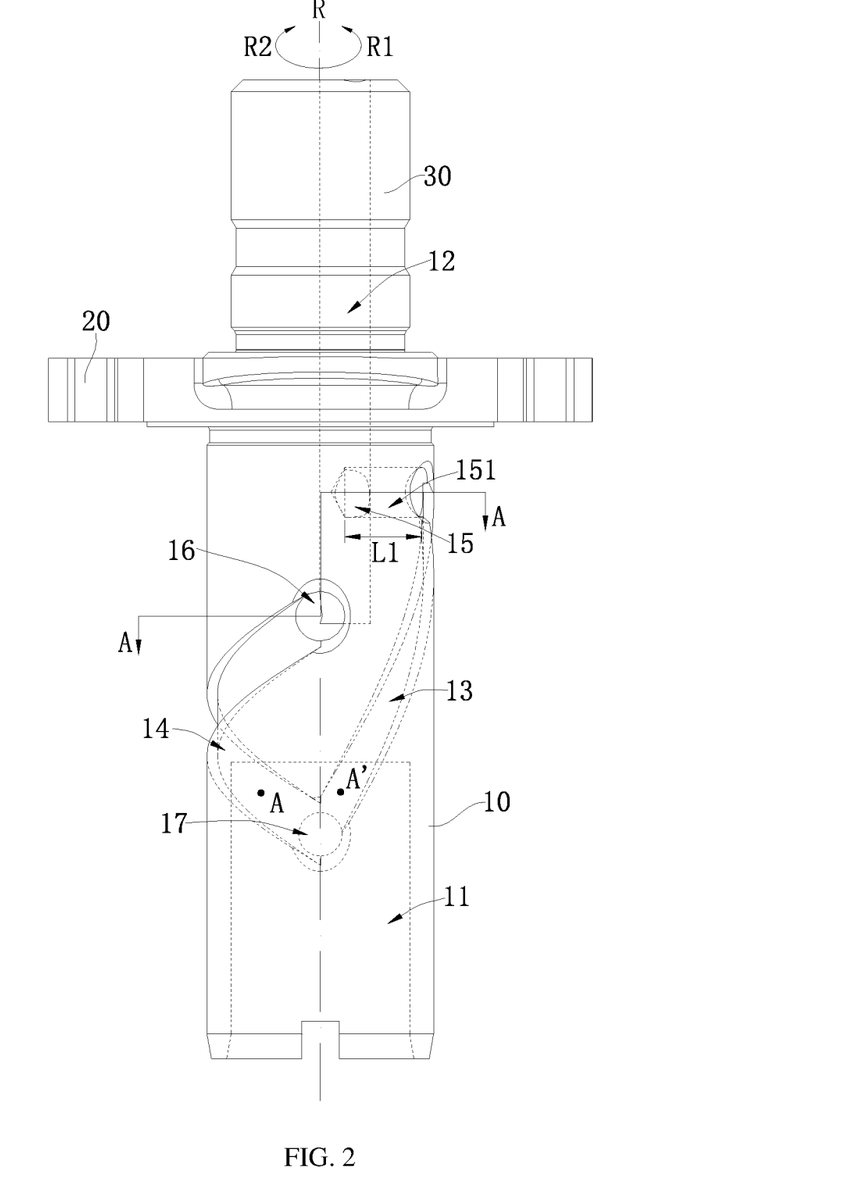
FIG. 2 is a schematic front structural view of the crankshaft illustrated in FIG. 1.

Reference will be made to FIG. 1 and FIG. 2. FIG. 1 is a schematic structural view of a crankshaft according to one embodiment of the present disclosure. FIG. 2 is a schematic structural front view of the crankshaft illustrated in FIG. 1, in which a partial structure is cut away to illustrate a flow path of the lubricating oil. The crankshaft according to some embodiments of present disclosure can realize stable lubricating oils supply at low-speed, medium-speed and high-speed rotations, and thus is adapted to be mounted in a compressor, especially an inverter compressor.

In some embodiments, as shown in FIG. 1 and FIG. 2, embodiments of the present disclosure provide a crankshaft. The crankshaft includes a main shaft 10, a crank 20, and a crank shaft 30. The main shaft 10 is configured to connect to an external driving component. The crank 20 is mounted at an end of the main shaft 10. The crank shaft 30 is connected to the main shaft 10 through the crank 20. The crank shaft 30 is eccentrically arranged relative to a central axis of the main shaft 10 (as shown by a center line R in FIG. 2). One end of the main shaft 10 away from the crank shaft 30 has an oil suction inner chamber 11. The oil suction inner chamber 11 extends along the central axis of the main shaft 10. Another end (or the other end) of the main shaft 10 connected to the crank shaft 30 has an oil distribution channel 12. The oil distribution channel 12 extends along the central axis of the main shaft 10. Further, the oil distribution channel 12 extends away from an end of the oil suction inner chamber 11 and penetrates the crank shaft 30. An end of the oil suction inner chamber 11 is opened to be in communication with an oil outlet of an oil pump. The oil distribution channel 12 is in communication with the oil suction inner chamber 11, and configured to allow lubricating oil to flow through the crankshaft to each operation component inside the compressor for lubrication. Thus, it is possible to ensure that each operation component of the compressor with the crankshaft can operate normally and can be cooled.

An outer wall surface of the main shaft 10 has a first spiral oil groove 13 and a second spiral oil groove 14. A spiraling direction of the first spiral oil groove 13 is opposite to a spiraling direction of the second spiral oil groove 14. In this embodiment, the first spiral oil groove 13 spirals in a clockwise direction (as shown in a direction illustrated by an arrow R2 in FIG. 1). The second spiral oil groove 14 spirals in a counterclockwise direction (as shown in a direction illustrated by an arrow R1 in FIG. 1). Each of the first spiral oil groove 13 and the second spiral oil groove 14 has a first end and a second end opposite to the first end. Further, the first end of each of first spiral oil groove 13 and the second spiral oil groove 14 faces towards a bottom end of the main shaft 10, and the second end of each of the first spiral oil groove 13 and the second spiral oil groove 14 faces towards a top end of the main shaft 10. Both the first ends of the two spiral oil grooves are in communication with the oil suction inner chamber 11. A peripheral wall of the oil distribution channel 12 has a first oil hole 15 and a second oil hole 16. The second end of the first spiral oil groove 13 is in communication with the oil distribution channel 12 through the first oil hole 15. The second end of the second spiral oil groove 14 is in communication with the oil distribution channel 12 through the second oil hole 16. Therefore, the oil suction inner chamber 11 is in communication with the oil distribution channel 12 through the first spiral oil groove 13 and the second spiral oil groove 14, respectively. In this way, since the first spiral oil groove 13 spirals in the clockwise direction, when the crankshaft rotates in the clockwise direction, the lubricating oil pumped into the oil suction inner chamber 11 by the oil pump enters the first spiral oil groove 13 in communication with the oil suction inner chamber 11, is lifted from the first end to the second end by means of a centrifugal force generated by the clockwise rotation of the main shaft 10, and flows into the oil distribution channel 12 through the first oil hole 15, and further flows out of the oil distribution channel 12 by manes of a centrifugal force of the crank shaft 30. Conversely, when the crankshaft rotates in the counterclockwise direction, the lubricating oil enters the second spiral oil groove 14 from the oil suction inner chamber 11, is lifted from the first end to a second section by means of a centrifugal force generated by the counterclockwise rotation of the main shaft 10, subsequentially flows into the oil distribution channel 12 through the second oil hole 16, and further flows out of the oil distribution channel 12 by means of the centrifugal force of the crank shaft 30. In this way, the compressor with the crankshaft of this embodiment, under the forward and backward rotation operating conditions, can supply the lubricating oil normally to the first spiral oil groove 13 and second spiral oil groove 14 that are different in the spiral direction on the main shaft 10, respectively, to realize the lubricating oil supply under operating conditions in different rotation directions.

Figure 3:
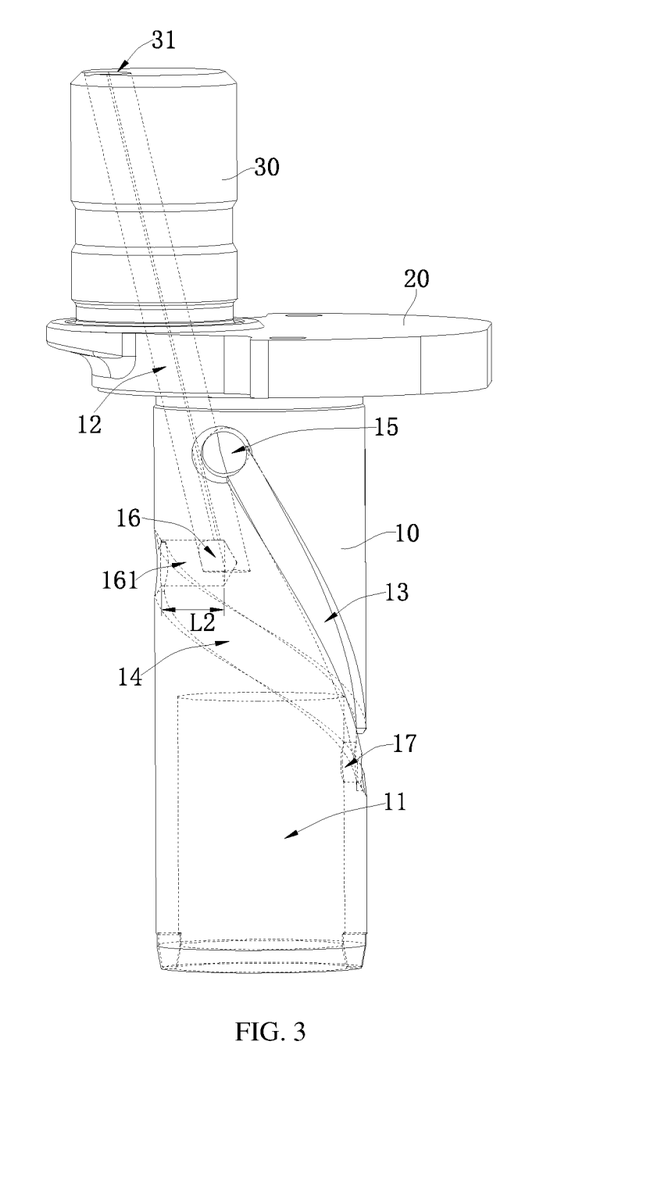
FIG. 3 is a schematic side structural view of the crankshaft illustrated in FIG. 1.
Figure 4:
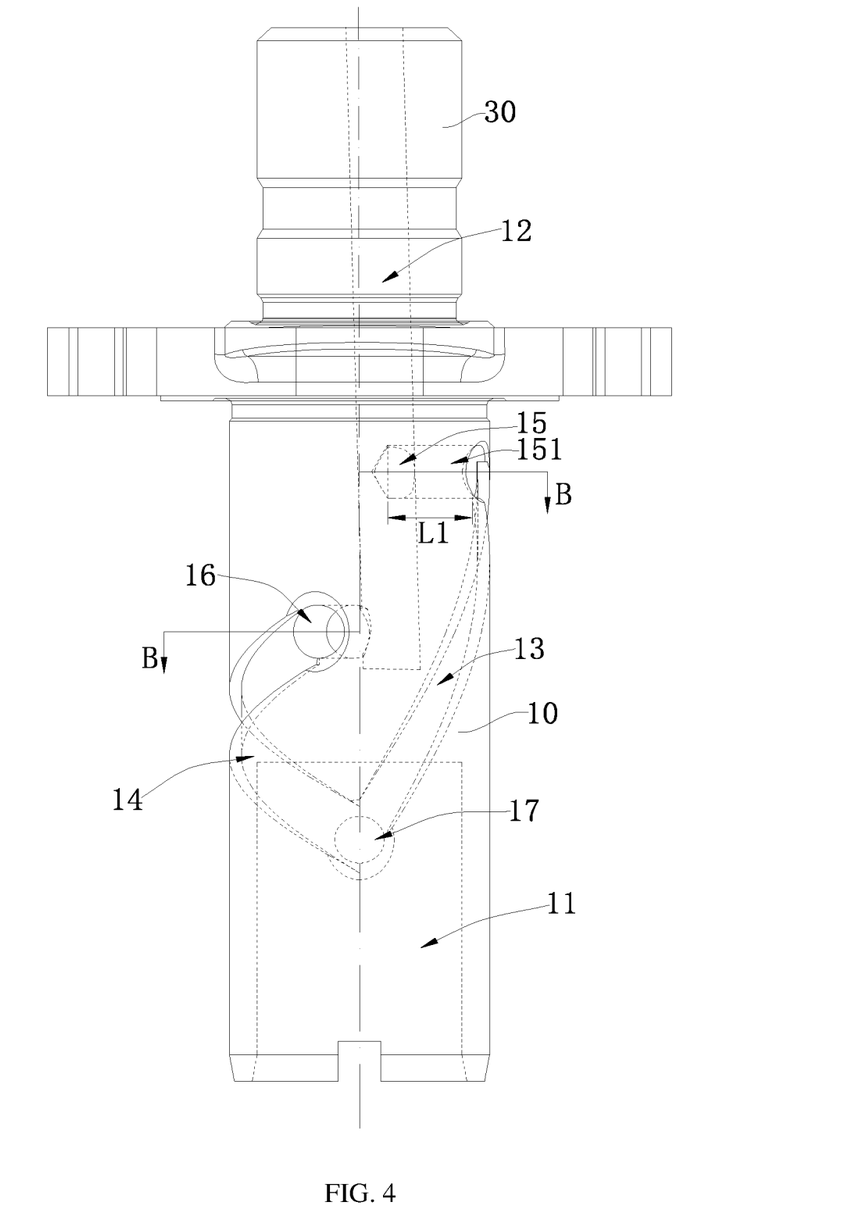
FIG. 4 is a schematic structural view of a crankshaft according to another embodiment of the present disclosure.
Figure 5:
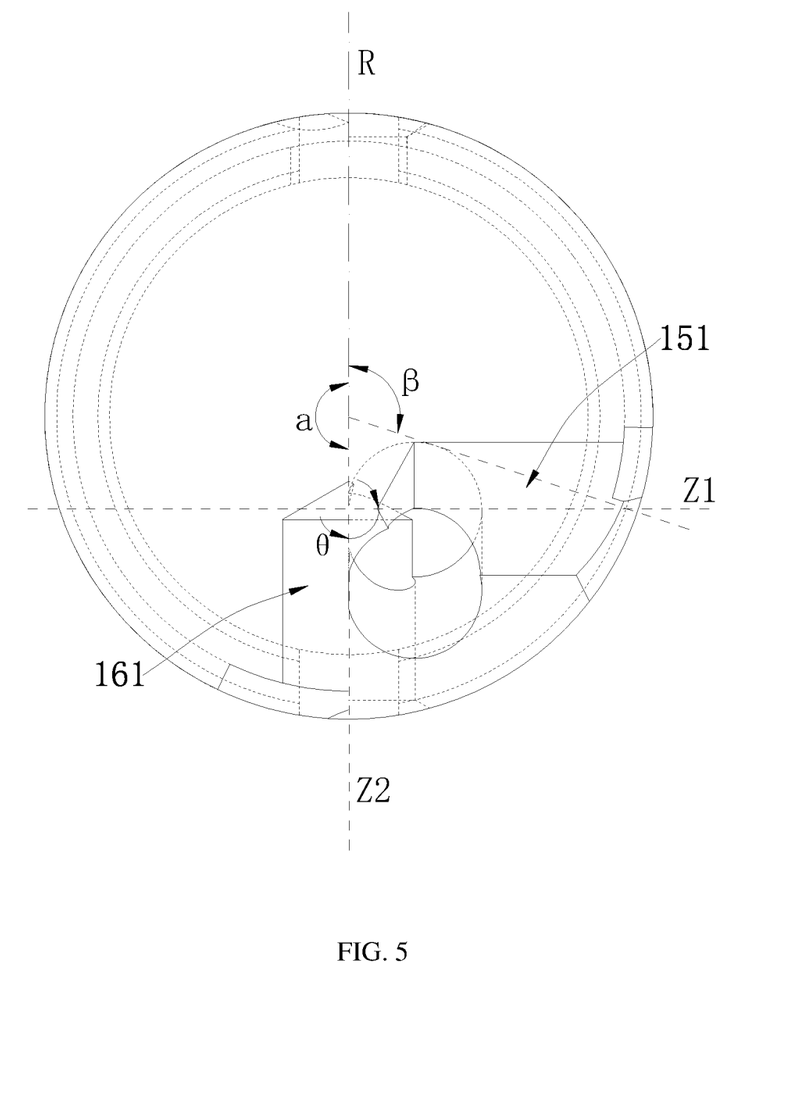
FIG. 5 is a cross-sectional view taking along line A-An in FIG. 2.
Figure 6:
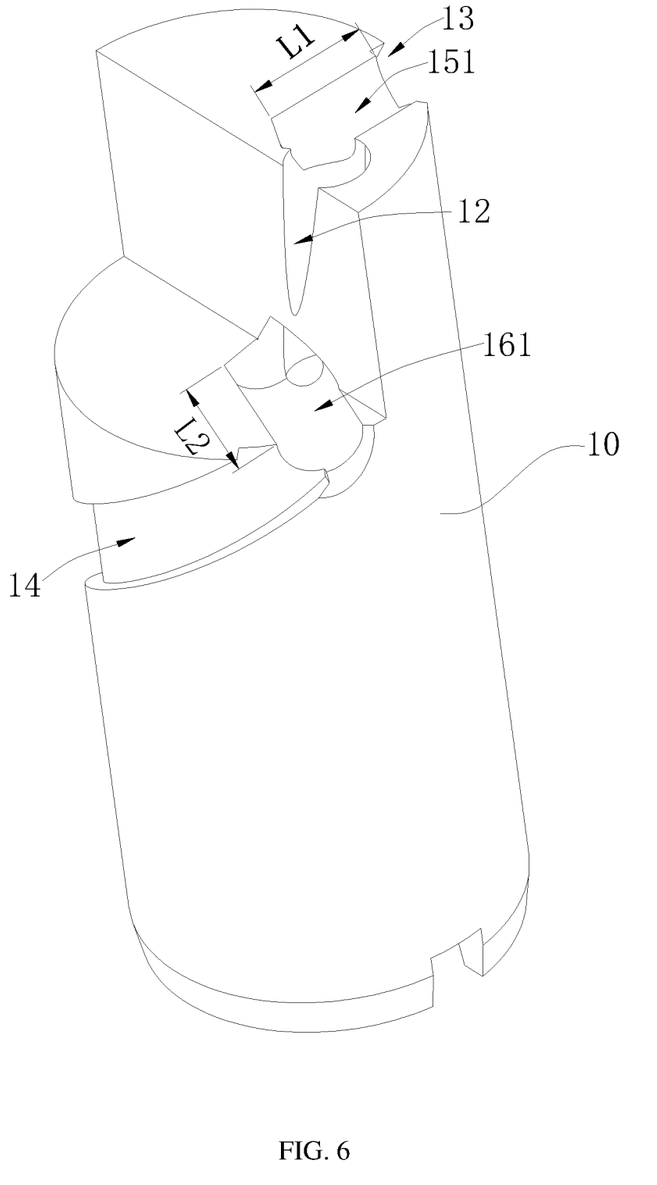
FIG. 6 is a partial schematic structural view taking along line B-B in FIG. 4.

Further, reference will be made to FIG. 2 to FIG. 6. FIG. 3 is a schematic side view of the crankshaft illustrated in FIG. 1. FIG. 4 is a schematic structural view of a crankshaft according to another embodiment of the present disclosure. FIG. 5 is a cross-sectional view taken along line A-An in FIG. 2. FIG. 6 is a schematic partial structural view taken along line B-B in FIG. 4, in which a partial structure is cut away, which is convenient to show a flow path of the lubricating oil.

In this embodiment, since there is a predetermined thickness between an outer peripheral wall of the main shaft 10 and the peripheral wall of the oil distribution channel 12, before the second end of the first spiral oil groove 13 is in communication with the first oil hole 15, and before the second end of the second spiral oil groove 14 is in communication with the second oil hole 16, it is necessary for both the first spiral oil groove 13 and the second spiral oil groove 14 to deflect towards inside the main shaft 10 and penetrate portions between the outer peripheral wall of the main shaft 10 and the peripheral wall of the oil distribution channel 12, respectively. In this way, on the main shaft 10, the second end of the first spiral oil groove 13 deflects towards the central axis of the main shaft 10 to form a first hole channel 151 in communication with the oil distribution channel 12, and the other end of the second spiral oil groove 14 deflects towards the central axis of the main shaft 10 to form a second hole channel 161 in communication with the oil distribution channel 12. The first oil hole 15 and the second oil hole 16 are outlets formed through penetrating the peripheral wall of the oil distribution channel 12 by the first hole channel 151 and the second hole channel 161, respectively. It should be noted that, when the crankshaft rotates and supplies the distribution oil, and when the lubricating oil flows in the first spiral oil groove 13 and the second spiral oil groove 14, the centrifugal force generated by the rotation of the main shaft 10 can serve as a power for driving the lubricating oil to be lifted. In addition, in a process in which the lubricating oil flows out of the second end of the first spiral oil groove 13 or the second spiral oil groove 14 and flows into the oil distribution oil channel 12 through the respective first hole channel 151 or second hole channel 161, since a flowing direction of the lubricating oil entering the oil distribution channel 12 is opposite to a direction of the centrifugal force, in this case, the centrifugal force generated by the rotation of the main shaft 10 becomes resistance subject to the lubricating oil when flowing through the first hole channel 151 and the second hole channel 161.

Thus, in this embodiment, a depth of the first hole channel 151 (as shown by L1 in FIG. 2) is set to be substantially equal to a depth of the second hole channel 161 (as shown by L2 in FIG. 3). That is, the first hole channel 151 and the second hole channel 161 perpetrate a wall of the main shaft 10 by a same length and subsequentially communicate with the oil distribution channel 12. Further, an area of an outlet of the first hole channel 151 is substantially equal to an area of an outlet of the second hole channel 161. That is, an opening area of the first oil hole 15 is substantially equal to an opening area of the second oil hole 16. In this way, on the one hand, it is possible to ensure that outflow cross-sectional areas of the lubricating oil when entering the oil distribution channel 12 are substantially equal to each other, and on the other hand, it is possible to ensure that an extending length of the first hole channel 151 is equal to an extending length of the second hole channel 161. In this way, resistances subject to the lubricating oil when flowing through the first and second hole channels are substantially same. Thus, when the main shaft 10 rotates forwards or backwards at the constant speed, the lubricating oil can flow out of the respective first oil hole 15 or second oil hole 16 at a substantially equal speed. In addition, a flow rate of a fluid discharged from an outlet is related to a cross-sectional area of the outlet and an outflow velocity when flowing out of the outlet, i.e., Q=v·A, where v is the outflow velocity, and A is the cross-sectional area of the outlet. Thus, the area of the outlet of the first oil hole 15 is equal to the area of the outlet of the second oil hole 16. Further, when an outflow velocity of the lubricating oil from the first oil hole 15 is equal to an outflow velocity of the lubricating oil from the second oil hole 16, it is possible to ensure that amounts of the lubricating oil flowing out of the first oil hole 15 and the second oil hole 16 are equal to each other.

Therefore, by designing the first hole channel 151 and the second hole channel 161 to have substantially equal extending depth and allowing the first hole channel 151 and the second hole channel 161 to be in communication with the first oil hole 15 and the second oil hole 16 with substantially equal opening area, respectively, it is possible to ensure that when the crankshaft rotates forwards and backwards at a predetermined speed, a substantially equal supply amount of the lubricating oil can be obtained to satisfy lubrication requirements of each friction pair in the compressor at the rotation speed. It should be noted that, since equal supply amount of the lubricating oil means that the supply amount of the lubricating oil can properly satisfy the lubrication demands, rather than meaning that amounts of supplied lubricating oil are exactly equal to each other at two times. Therefore, the phase "a deflection depth of the first hole channel 151 is substantially equal to a deflection depth of the second hole channel 161" herein in this embodiment means that the deflection depths of the two hole channels are substantially equal to each other in a predetermined processing error, rather than meaning that the deflection depths of the two hole channels are exactly equal to each other. In this embodiment, the phase "the area of the outlet of the first hole channel is substantially equal to the outlet area of the second hole channel" herein means that two areas of the outlets (i.e., the first oil hole 15 and the second oil hole 16) are substantially equal in a predetermined processing error, rather than meaning that the two areas of the outlets are exactly equal to each other.

With the crankshaft according to some embodiments of the present disclosure, by forming the first spiral oil groove 13 and the second spiral oil groove 14 that are opposite in the spiral direction on the main shaft 10, it is ensured that the compressor with the crankshaft can supply the lubricating oil through the first spiral oil groove 13 and the second spiral oil groove 14 respectively when rotating forwards and backwards. The first spiral oil groove 13 is in communication with the oil distribution channel 12 through the first hole channel 151. The second spiral oil groove 14 is in communication with the oil distribution channel 12 through the second hole channel 161. Further, it is ensured that the depth, extending in the main shaft 10, of the first hole channel 151 is equal to the depth, extending in the main shaft 10, of the second hole channel 161. That is, it is ensured that both the end of the first spiral oil groove 13 and the end of the second spiral oil groove 14 penetrate the side wall of the main shaft 10 by a same thickness and subsequentially are in communication with the oil distribution oil channel 12. Further, the first oil hole 15 and the second oil hole 16 with the same opening area are formed on the peripheral wall of the oil distribution channel 12. Therefore, since the depths of the first hole channel 151 and the second hole channel 161 are equal to each other, when the crankshaft rotates forwards and backwards at a same speed, resistances subject to the lubricating oil when entering the oil distribution channel 12 through the two hole channels are same to each other to ensure that the lubricating oil can flow through the first hole channel 151 and the second hole channel 162 at the same velocity. In this way, it is possible to ensure that an amount of the lubricating oil supplied from the first spiral oil groove 13 is equal to an amount of the lubricating oil supplied through the second spiral oil groove 14 when the crankshaft rotates forwards and backwards at the same rotation speed. Therefore, when the crankshaft rotates forwards and backwards at the constant speed, equal supply amount of the lubricating oil of the crankshaft can be realized, which can avoid insufficient supply of the lubricating oil in one direction or excessive supply of the lubricating oil in another direction when the crankshaft rotates at the constant speed.

In another embodiment of the present disclosure, as shown in FIG. 2, FIG. 3, and FIG. 4, both the first hole channel 151 and the second hole channel 161 deflect and extend in a radial direction of the main shaft 10. In this way, the first hole channel 151 and the second hole channel 161 extend at a minimum deflection length to be in communication with the respective first oil hole 15 and second oil hole 16, which can reduce resistance subject to the lubricating oil when flowing through the first hole channel 151 and the second hole channel 161 to prevent the lubricating oil from being jammed in the first hole channel 151 or the second hole channel 161. Thus, it is possible to ensure that the lubricating oil can smoothly enter the oil distribution channel 12 at a predetermined flow rate.

In another embodiment of the present disclosure, referring to FIG. 2 and FIG. 4 to FIG. 6 together. In this embodiment, the first spiral oil groove 13 spirals at a first spiral angle in the outer peripheral wall of the main shaft 10. The second spiral oil groove 14 spirals at a second spiral angle in the outer peripheral wall of the main shaft 10. As shown in FIG. 2, FIG. 4, and FIG. 5, the first spiral angle refers to: by assuming lubricating oil in the first spiral oil groove 13 as a mass point A' with a predetermined mass, an angle by which the mass point A' rotates around the outer peripheral wall of the main shaft 10 when flowing from the first end to the second end of the first spiral oil groove 13, i.e., flowing from a starting end to an ending end of the first spiral oil groove 13, which is illustrated by an included angle α in FIG. 5. The second spiral angle refers to: by assuming lubricating oil of the second spiral oil groove 14 as the mass point A having a predetermined mass, an angle by which the mass point A' rotates around the outer peripheral wall of the main shaft 10 when flowing from the first end to the second end of the second spiral oil groove 14, i.e., flowing from a starting end to an ending end of the second spiral oil groove 14, which is illustrated by an included angle β in FIG. 5.

Further, in this embodiment, both the first spiral angle and the second spiral angle do not exceed 180°. When the first spiral oil groove 13 or the second spiral oil groove 14 spirals around the main shaft 10 by a maximum angle of 180°, the first end and the second end of each of the spiral oil grooves are located on two opposite side walls of the outer peripheral wall of the main shaft 10 in the axial direction, respectively. At this time, as shown in FIG. 2, FIG. 4, and FIG. 5, when the second spiral angle is greater than the first spiral angle, the oil distribution channel 12 may be arranged close to the second hole channel 161. That is, the oil distribution channel 12 is disposed on a side, in which the second hole channel 161 is formed, of the main shaft 10, which can allow the second hole channel 161 to extend to the first oil hole 15 at a shorter depth L2 to be in communication with the first oil hole 15. Further, in an extending direction of the central axis of the main shaft 10, as shown in FIG. 2, the oil distribution channel 12 is arranged to deflect towards the first hole channel 151, or as shown in FIG. 4 and FIG. 6, the oil distribution channel 12 is arranged to be inclined towards the first hole channel 151 to reduce the extending depth L1 of the first hole channel 151. As a result, it is possible to ensure that the first hole channel 151 and the second hole channel 161 have a substantially equal deflection depth (even if L1 in the drawings is substantially equal to L2), which makes amounts of the lubricating oil flowing out of the first oil hole 15 and the second oil hole 16 substantially equal to each other.

In another embodiment of the present disclosure, the oil distribution channel 12 may also be formed at a predetermined position of the main shaft 10 (not shown). That is, the central axis of the main shaft 10 passes through a center of the oil distribution channel 12. The first spiral oil groove 13 and the second spiral oil groove 14 spiral at the same spiral angle in the outer peripheral wall of the main shaft 10. In this way, a distance between the peripheral wall of the oil distribution channel 12 and the second end of the first spiral oil groove 13 is equal to a distance between the peripheral wall and the second end of the second spiral oil groove 14. In this way, the first hole channel 151 and the second hole channel 161 that have the same deflection depth can be provided to realize substantially equal supply amount of the lubricating oil during the forward and backward constant-speed rotations when the oil distribution channel 12 is arranged at a center of the main shaft 10.

In another embodiment of the present disclosure, referring to FIG. 1 and FIG. 2, the first spiral oil groove 13 and the second spiral oil groove 14 may have a same spiral pitch. Thus, it is further possible to ensure that the amounts of the lubricating oil supplied by the first spiral oil groove 13 and the second spiral oil groove 14 are substantially equal to each other when the crankshaft rotates forwards or backwards at the substantially same rotation speeds, and oil supply control is thus more convenient.

It should be understood that the first spiral oil groove 13 and the second spiral oil groove 14 may have different spiral pitches. At this time, when the crankshaft has a higher rotation speed in a predetermined rotation direction, the crankshaft needs to provide a greater lubricating oil supply amount in this rotation direction. In this way, by setting different spiral pitches of the two spiral oil grooves, an extending length of one of the two spiral oil grooves can be set to be longer to match with a rotation speed of the crankshaft in this direction. Thus, a supply amount of the lubricating oil in the rotation direction at the greater rotation speed can be improved, and obvious excessive oil supply in the rotation direction at the smaller rotation speed can be avoided.

In another embodiment of the present disclosure, referring to FIG. 1 and FIG. 2, an oil inlet hole 17 is further defined at a position close to a bottom of the main shaft 10. The oil inlet hole 17 penetrates the oil suction inner chamber 11. The first spiral oil groove 13 and the second spiral oil groove 14 are in communication with the oil suction inner chamber 11 through the oil inlet hole 17. Subsequentially, lubricating oil in the oil suction inner chamber 11 may enter the first spiral oil groove 13 and the second spiral oil groove 14 through the oil inlet hole 17 by a pressure from the oil pump.

In some embodiments, as shown in FIG. 1, one oil inlet hole 17 may be defined in the main shaft 10. The two spiral oil grooves are in communication with the oil suction inner chamber 11 through the one oil inlet hole 17. Thus, by forming only one oil inlet hole 17 in the main shaft 10, it is possible to reduce processing and manufacturing steps of the main shaft 10, lower processing difficulty, and improve production precision and efficiency of the main shaft 10.

In addition, in some other embodiments (not shown), two oil inlet holes 17 may be formed in the main shaft 10. The two spiral oil grooves are in communication with the oil suction inner chamber 11 through the two different oil inlet holes 17. Thus, the two spiral oil grooves are in independent communication with the oil suction inner chamber 11, and no mutual influence is generated between the oil supply of the two spiral oil grooves. For the main shaft 10 of larger sizes, the difficulty of processing the two oil inlet holes 17 is relatively low, and thus the design may be adopted.

In another embodiment of the present disclosure, referring to FIG. 2 and FIG. 3, an outlet of the first hole channel 151 and an outlet of the second hole channel 161, i.e., the arrangement of the first oil hole 15 and the second oil hole 16, will be described below. In some embodiments of the present disclosure, the first oil hole 15 and the second oil hole 16 may be located at any position on the peripheral wall of the oil distribution channel 12 as long as the first hole channel 151 and the second hole channel 161 have the substantially same deflection depth.

In some embodiments, the first oil hole 15 and the second oil hole 16 are located on two opposite sides or two adjacent sides of the peripheral wall of the oil distribution channel 12 (as shown in FIG. 2), respectively, i.e., located on different sides of the peripheral wall of the oil distribution channel 12. In this case, the first spiral oil groove 13 and the second spiral oil groove 14 can supply the lubricating oil to the oil distribution oil channel 12 from different sides of the peripheral wall of the oil distribution channel 12, respectively. In this way, the first spiral oil groove 13 and the second spiral oil groove 14 may be arranged on two opposite sides of the main shaft 10 in the radial direction of the main shaft 10, respectively, and may be substantially symmetrically arranged on the outer peripheral wall of the main shaft 10 as much as possible. Since a groove defined in the outer peripheral wall of the main shaft 10 would affect overall strength of the main shaft 10, the substantially symmetrical arrangement of the two oil grooves on two sides of the main shaft 10 can reduce an influence of the oil grooves on the overall strength of the main shaft 10 as much as possible.

Additionally, in some embodiments, the first oil hole 15 and the second oil hole 16 may also be located on a same side of the peripheral wall of the oil distribution channel 12. In this case, the extending length of one of the two oil grooves may be set to be longer. In this way, when the crankshaft has a higher rotation speed in a predetermined rotation direction, the crankshaft needs to provide a larger supply amount of the lubricating oil in this rotation direction. Correspondingly, a length of an oil groove with a same spiral direction as the rotation direction is set to be longer, which can improve the supply amount of the lubricating oil in this direction. For example, in a further embodiment, when a rotation speed of the crankshaft in the clockwise direction is higher, the first spiral oil groove 13 is set to be longer than the second spiral oil groove 14. As a result, when the crankshaft rotates in the clockwise direction, the amount of the lubricating oil supplied by the first spiral oil groove 13 is larger, which is more beneficial to lubrication of the crankshaft and other operation components of the compressor with the crankshaft.

Figure 7:
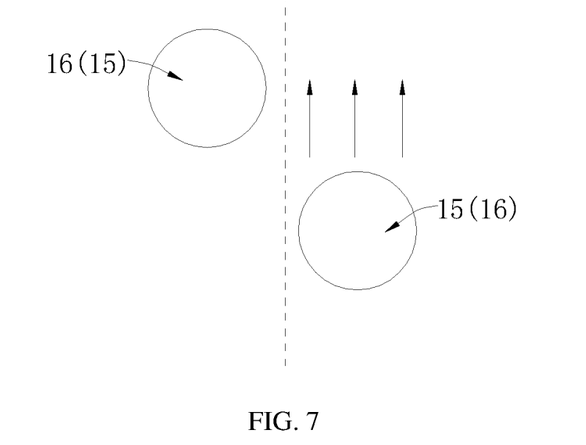
FIG. 7 is a schematic view of a positional relationship between an outlet of a first hole channel and an outlet of a second hole channel of a crankshaft according to an embodiment of the present disclosure.
Figure 8:
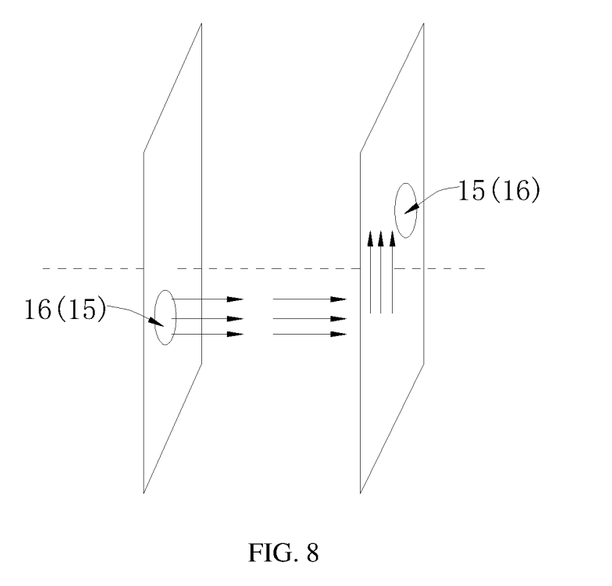
FIG. 8 is another schematic view of a positional relationship between an outlet of a first hole channel and an outlet of a second hole channel of a crankshaft according to another embodiment of the present disclosure.

In another embodiment of the present disclosure, referring to FIG. 2, FIG. 5, FIG. 7, and FIG. 8 together, a relative positional relationship between the outlet of the first hole channel 151 and the outlet of the second hole channel 161 (i.e., the first oil hole 15 and the second oil hole 16) is further described. FIG. 7 and FIG. 8 are schematic views of a positional relationship between an outlet of a first hole channel and an outlet of a second hole channel of a crankshaft according to different embodiments. As shown in FIG. 5, a plane extending in the radial direction of the main shaft 10 is defined a projection plane. An included angle between a central axis of the first hole channel 151 (shown by Z1 in FIG. 5) and a central axis of the second hole channel 161 (shown by Z2 in FIG. 5) on the projection plane is θ, where θ satisfies 25°<θ<155°.

In this range, when the two oil holes are defined on the same side or two adjacent sides of the peripheral wall of the oil distribution channel 12, as shown in FIG. 7, it is ensured that the two oil holes are staggered with each other in the axial direction (as shown by a dotted line in FIG. 7) of the main shaft 10. When the crankshaft rotates at a lower rotation speed, a centrifugal force subject to the lubricating oil is relatively small, and most of the lubricating oil is delivered by the pumping pressure from the oil pump in an axial direction of the main shaft 10, and flows in a direction shown by an arrow in FIG. 7 after flowing out of the respective oil holes. Since the two oil holes are staggered with each other in the axial direction of the main shaft 10, it is possible to avoid leakage of the lubricating oil flowing in the axial direction when lifted along a channel wall of the oil distribution channel 12. In addition, when the first oil hole 15 and the second oil hole 16 are located on the two opposite sides of the peripheral wall of the oil distribution channel 12, as shown in FIG. 8, it is ensured that the two oil holes are staggered with each other in the radial direction of the main shaft 10 (as shown by a dotted line in FIG. 8). When the crankshaft of the embodiment rotates at a high rotation speed, the lubricating oil flows out of the first oil hole 15 or the second oil hole 16, and most of the lubricating oil is thrown out in the radial direction of the main shaft 10 due to a centrifugal force, and subsequentially flows in the direction shown by the arrow in FIG. 7 after flowing out. Since the two oil holes are staggered with each other in the radial direction of the main shaft 10, it is possible to avoid the leakage of the lubricating oil flowing in the axial direction when lifted along the channel wall of the oil distribution channel 12.

In some other embodiments, the included angle θ may be 30°, 45°, 60°, 75°, 90°, 120°, 145°, etc., which may be selected as desired, and a value of the included angle θ is not uniquely defined herein.

In another embodiment of the present disclosure, with continued reference to FIG. 1 and FIG. 2, in this embodiment, the outlet of the first hole channel 151 and the outlet of the second hole channel 161 are arranged at a same level or at different levels in a central axis direction of the main shaft 10. That is, the level of the second oil holes 16 is same as or different from that of the first oil hole 15. The expression "arranged at the same level" means that a level of a central axis of the first oil hole 15 is same as that of a central axis of the second oil hole 16. The expression "arranged at the different levels" means that a top of an opening of the first oil hole 15 is located at a lower level than a top of an opening of the second oil hole 16, and a bottom of the opening of the first oil hole 15 is located at a lower level than a bottom of the opening of the second oil hole 16. That is, the first oil hole 15 and the second oil hole 16 are at least partially staggered with each other in a height direction.

In some other embodiments, a top of the outlet the second hole channel 161 (i.e., the top of the opening of the second oil hole 16) is located at a lower level than a bottom of outlet of the first hole channel 151 (i.e., the bottom of the opening of the first oil hole 15), or a top of the outlet of the second hole channel 161 and a bottom of the outlet of the first hole channel 151 are located on a same straight line in the radial direction of the main shaft 10. That is, the first oil hole 15 and the second oil hole 16 are also exactly staggered with each other in the axial direction of the main shaft 10 to further reduce a leakage amount of the lubricating oil through the first oil hole 15 or the second oil hole 16. Thus, the sufficient supply amount of the lubricating oil can be ensured.

In another embodiment of the present disclosure, referring to FIG. 1, the oil distribution channel 12 of the embodiment is formed as a straight channel A top of the crank shaft 30 has an oil outlet hole 31. The oil distribution channel 12 penetrates the oil outlet hole 31. The lubricating oil flows out from the top of the crank shaft 30 through the oil distribution channel 12, and finally reaches an interior of the compressor with the crankshaft and effectively lubricates each operation component.

Figure 9:
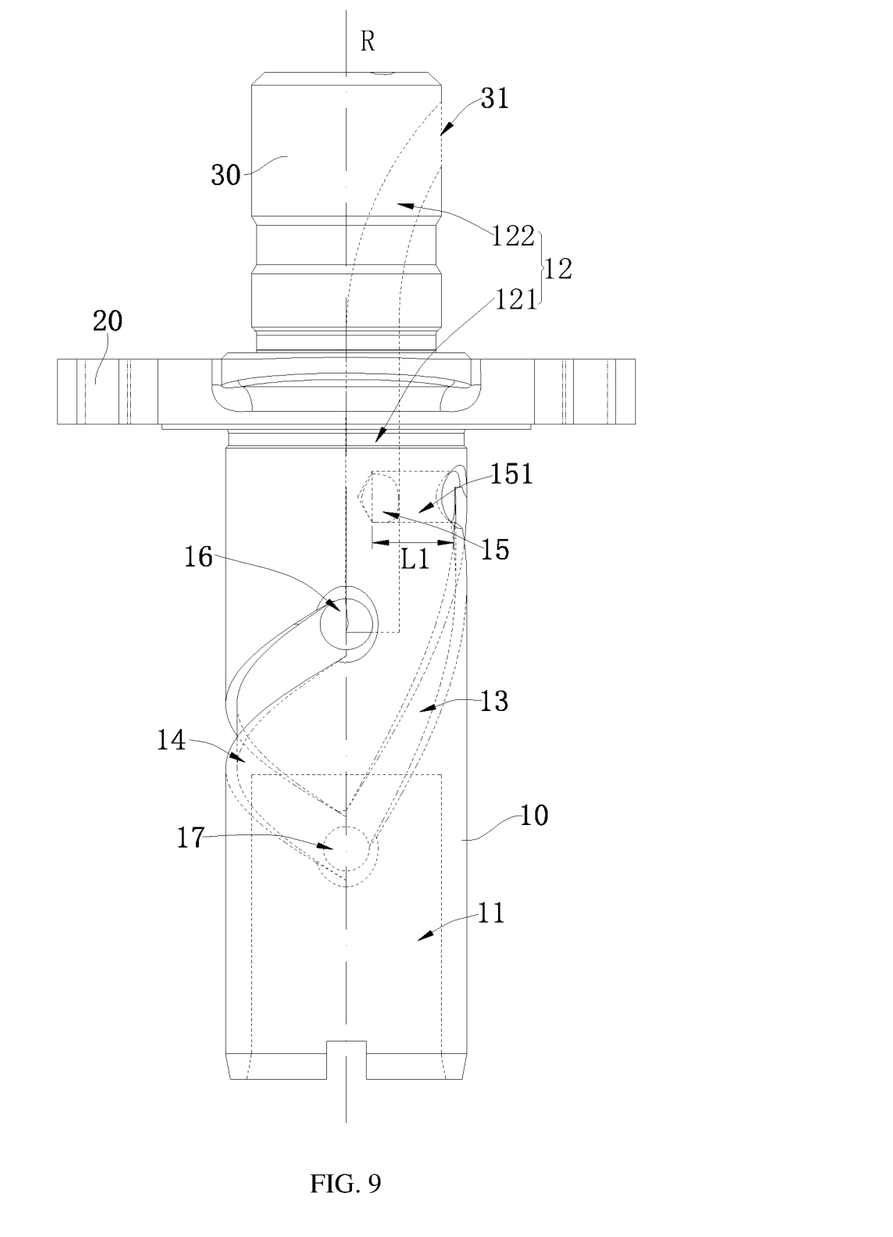
FIG. 9 is a schematic front structural view of a crankshaft according to yet another embodiment of the present disclosure.

In some other embodiments of the present disclosure, reference will be made to FIG. 9, which is a schematic front view of a crankshaft according to yet another embodiment of the present disclosure, in which a partial structure is cut away, which is convenient to show a flow path of the lubricating oil. In this embodiment, a section of the oil distribution channel 12 located in the main shaft 10 is a straight channel section 121, and a section of the oil distribution channel 12 located in the crank shaft 30 is an arc-shaped channel section 122 bent away from the main shaft 10. An oil outlet hole 31 is defined in a side wall of the crank shaft 30. The arc-shaped channel section 122 penetrates the oil outlet hole 31. When the crankshaft rotates at a high speed, the lubricating oil flows out from a top of the crankshaft, which may result in a relatively high oil outlet position, and is inconvenient to lubricate components such as a piston at a relatively low arrangement position in the compressor. Therefore, the oil outlet hole 31 is defined on the side wall of the crank shaft 30. The oil distribution channel 12 extends into the crank shaft 30 and is subsequently formed into an arc-shaped channel bent away from the main shaft 10, As a result, the lubricating oil can flow out of the outer peripheral wall of the crank shaft 30 to better lubricate components such as the piston. Moreover, an arc-shaped channel bent away from the main shaft 10 can make good use of the centrifugal force generated when the crank shaft 30 rotates, and an outflow rate of the lubricating oil can be further ensured.

In some embodiments, a part of the oil distribution channel 12 located in the crank shaft 30 may be formed into a straight channel, as long as the straight channel is partially inclined relative to the central axis of the crank shaft 30.

According to some embodiments of the present disclosure, the crankshaft can stably and reliably provide lubricating oil during its forward and backward rotations. Further, the crankshaft can also ensure the sufficient supply of lubricating oil during its high-speed or low-speed rotation, which enables an inverter compressor with the crankshaft to operate efficiently and reliably under high-frequency and low-frequency operating conditions. Thus, variable-frequency operation of the inverter compressor is more stable and reduces more energy consumption.

Another embodiment of the present disclosure further provides an inverter compressor including the crankshaft as described above.

With the inverter compressor according to some embodiments of the present disclosure, by using the crankshaft as described above, the inverter compressor with the crankshaft can provide an equal supply amount of lubricating oil when rotates forwards and backwards at a constant-speed. Thus, it is possible to ensure that the compressor can effectively operate at the constant speed in forward and backward rotation directions, which reduces wear of a friction pair or waste of the lubricating oil. Thus, it is possible to ensure that the compressor can provide stably oil supply under different frequency-variable operating conditions, and thus the operation of the compressor is more stable and efficient. In addition, the inverter compressor further achieves other technical effects of the crankshaft provided in the above various embodiments, and details thereof are omitted herein.

Another embodiment of the present disclosure further provides a refrigeration device including the inverter compressor as described above.

With the refrigeration device according to some embodiments of the present disclosure, since the inverter compressor in the above various embodiments is employed, the refrigeration device operates more stably and has more stable refrigeration effect, lower operation consumption, and longer service life. In addition, the refrigeration device also has other technical effects of the inverter compressor provided in the above various embodiments, and details thereof are omitted herein.

In some embodiments, the above refrigeration device may be a refrigerator, an air conditioner, or the like.

The above are merely exemplary embodiments of the present disclosure, and are not intended to limit the present disclosure. Various changes and variations of the present disclosure are conceivable for those skilled in the art. Any modification, equivalent replacement, modification, etc., made within the spirit and principle of the present disclosure shall be fallen within the scope of the present disclosure.

What is claimed is:

1. A crankshaft comprising:
a main shaft;
a crank; and
a crank shaft mounted at an end of the main shaft through the crank, wherein:
one end of the main shaft away from the crank shaft has an oil suction inner chamber, and another end of the main shaft connected to the crank shaft has an oil distribution channel extending to and perpetrating the crank shaft;
an outer wall surface of the main shaft has a first spiral oil groove and a second spiral oil groove, wherein:
a spiraling direction of the first spiral oil groove is opposite to a spiraling direction of the second spiral oil groove;
one end of each of the first spiral oil groove and the second spiral oil groove is in communication with the oil suction inner chamber, another end of the first spiral oil groove deflects towards a central axis of the main shaft to form a first hole channel in communication with the oil distribution channel, and another end of the second spiral oil groove deflects towards the central axis of the main shaft to form a second hole channel in communication with the oil distribution channel; and
a depth of the first hole channel is substantially equal to a depth of the second hole channel, and an area of an outlet, in communication with a distribution oil hole, of the first hole channel is substantially equal to an area of an outlet, in communication with the distribution oil hole, of the second hole channel.

2. The crankshaft according to claim 1, wherein both the first hole channel and the second hole channel extend in a radial direction of the main shaft.

3. The crankshaft according to claim 1, wherein:
the first spiral oil groove spirals in an outer peripheral wall of the main shaft at a first spiral angle;
the second spiral oil groove spirals in the outer peripheral wall of the main shaft at a second spiral angle greater than the first spiral angle, both the first spiral angle and the second spiral angle being equal to or smaller than 180°; and
the oil distribution channel is disposed close to the second hole channel, and is offset from or inclined towards the first hole channel in an extending direction of the central axis of the main shaft.

4. The crankshaft according to claim 1, wherein:
the oil distribution channel is disposed at a central position of the main shaft; and
the first spiral oil groove and the second spiral oil groove spiral in an outer peripheral wall of the main shaft at a substantially same spiral angle.

5. The crankshaft according to claim 1, wherein the first spiral oil groove and the second spiral oil groove have a same spiral pitch.

6. The crankshaft according to claim 1, wherein the outlet of the first hole channel and the outlet of the second hole channel are arranged at a same level in the central axis direction of the main shaft.

7. The crankshaft according to claim 1, wherein the outlet of the first hole channel and the outlet of the second hole channel are arranged at different levels in the central axis direction of the main shaft.

8. The crankshaft according to claim 7, wherein a top of the outlet of the second hole channel is arranged at an equal or lower level than a bottom of the outlet of the first hole channel.

9. The crankshaft according to claim 1, wherein the main shaft further has an oil inlet hole, the first spiral oil groove and the second spiral oil groove being in communication with the oil suction inner chamber through the oil inlet hole.

10. The crankshaft according to claim 9, wherein:
one oil inlet hole is provided, the first spiral oil groove and the second spiral oil groove being in communication with the oil suction inner chamber through the one oil inlet hole; or
two oil inlet holes are provided, the first spiral oil groove and the second spiral oil groove being in communication with the oil suction inner chamber through the two oil inlet holes, respectively.

11. The crankshaft according to claim 1, wherein the oil distribution channel is a straight channel.

12. The crankshaft according to claim 1, wherein:
a section of the oil distribution channel located in the main shaft is a straight channel section; and
a section of the oil distribution channel located in the crank shaft is an arc-shaped channel section bent away from the main shaft.

13. The crankshaft according to claim 1, wherein an included angle θ between a projection line of a central axis of the first hole channel and a projection line of a central axis of the second hole channel on a projection plane satisfies 25°<θ<155°, the projection plane being a plane extending in a radial direction of the main shaft.

14. An inverter compressor comprising a crankshaft, the crankshaft comprising:
a main shaft;
a crank; and
a crank shaft mounted at an end of the main shaft through the crank, wherein:
one end of the main shaft away from the crank shaft has an oil suction inner chamber, and another end of the main shaft connected to the crank shaft has an oil distribution channel extending to and perpetrating the crank shaft;
an outer wall surface of the main shaft has a first spiral oil groove and a second spiral oil groove, wherein:
a spiraling direction of the first spiral oil groove is opposite to a spiraling direction of the second spiral oil groove;
one end of each of the first spiral oil groove and the second spiral oil groove is in communication with the oil suction inner chamber, another end of the first spiral oil groove deflects towards a central axis of the main shaft to form a first hole channel in communication with the oil distribution channel, and another end of the second spiral oil groove deflects towards the central axis of the main shaft to form a second hole channel in communication with the oil distribution channel; and a depth of the first hole channel is substantially equal to a depth of the second hole channel, and an area of an outlet, in communication with a distribution oil hole, of the first hole channel is substantially equal to an area of an outlet, in communication with the distribution oil hole, of the second hole channel.

15. The inverter compressor according to claim 14, wherein both the first hole channel and the second hole channel extend in a radial direction of the main shaft.

16. The inverter compressor according to claim 14, wherein:

the first spiral oil groove spirals in an outer peripheral wall of the main shaft at a first spiral angle;

the second spiral oil groove spirals in the outer peripheral wall of the main shaft at a second spiral angle greater than the first spiral angle, both the first spiral angle and the second spiral angle being equal to or smaller than 180°; and the oil distribution channel is disposed close to the second hole channel, and is offset from or inclined towards the first hole channel in an extending direction of the central axis of the main shaft.

17. The inverter compressor according to claim 14, wherein:

the oil distribution channel is disposed at a central position of the main shaft; and the first spiral oil groove and the second spiral oil groove spiral in an outer peripheral wall of the main shaft at a substantially same spiral angle.

18. The inverter compressor according to claim 14, wherein the first spiral oil groove and the second spiral oil groove have a same spiral pitch.

19. The inverter compressor according to claim 14, wherein the outlet of the first hole channel and the outlet of the second hole channel are arranged at a same level in the central axis direction of the main shaft.

20. A refrigeration device comprising an inverter compressor, wherein the inverter compressor comprise a crankshaft, the crankshaft comprising:

a main shaft;

a crank; and a crank shaft mounted at an end of the main shaft through the crank, wherein:

one end of the main shaft away from the crank shaft has an oil suction inner chamber, and another end of the main shaft connected to the crank shaft has an oil distribution channel extending to and perpetrating the crank shaft;

an outer wall surface of the main shaft has a first spiral oil groove and a second spiral oil groove, wherein:

a spiraling direction of the first spiral oil groove is opposite to a spiraling direction of the second spiral oil groove;

one end of each of the first spiral oil groove and the second spiral oil groove is in communication with the oil suction inner chamber, another end of the first spiral oil groove deflects towards a central axis of the main shaft to form a first hole channel in communication with the oil distribution channel, and another end of the second spiral oil groove deflects towards the central axis of the main shaft to form a second hole channel in communication with the oil distribution channel; and a depth of the first hole channel is substantially equal to a depth of the second hole channel, and an area of an outlet, in communication with a distribution oil hole, of the first hole channel is substantially equal to an area of an outlet, in communication with the distribution oil hole, of the second hole channel.

\* \* \* \* \*